(12) United States Patent
Porath

(10) Patent No.: US 10,406,875 B1
(45) Date of Patent: Sep. 10, 2019

(54) PROTECTIVE SEALING PLUG SYSTEM FOR TOWING HITCH RECEIVERS WITH SELF LUBRICATING STORAGE CONTAINER

(71) Applicant: Steven Hugh Porath, Painesville, OH (US)

(72) Inventor: Steven Hugh Porath, Painesville, OH (US)

( * ) Notice: Subject to any disclaimer, the term of this patent is extended or adjusted under 35 U.S.C. 154(b) by 0 days.

(21) Appl. No.: 14/489,519

(22) Filed: Sep. 18, 2014

(51) Int. Cl.
*B60D 1/60* (2006.01)

(52) U.S. Cl.
CPC .................................. *B60D 1/605* (2013.01)

(58) Field of Classification Search
CPC ....................................................... B60D 1/60
See application file for complete search history.

(56) References Cited

U.S. PATENT DOCUMENTS

| | | | | | |
|---|---|---|---|---|---|
| 323,022 | A | * | 7/1885 | Boone | A01K 1/04 119/791 |
| 2,905,355 | A | * | 9/1959 | Orser | B65D 39/12 220/235 |
| 3,578,027 | A | * | 5/1971 | Zopfi | F16L 55/1141 138/89 |
| 3,667,640 | A | * | 6/1972 | Morrow | F16L 55/132 138/89 |
| 3,836,035 | A | * | 9/1974 | Simbirdi | B65D 39/12 220/235 |
| 4,023,648 | A | * | 5/1977 | Orlitzky | F16N 11/10 184/39 |
| 4,040,641 | A | * | 8/1977 | Riecke | B60D 1/60 280/507 |
| 4,310,029 | A | * | 1/1982 | Dudek | F28F 11/02 138/89 |
| 4,979,843 | A | * | 12/1990 | Perry | B60R 19/48 138/89 |
| 5,044,403 | A | * | 9/1991 | Chen | F16L 55/132 138/89 |
| 5,168,902 | A | * | 12/1992 | Hood | F16L 55/132 138/89 |
| 5,242,018 | A | * | 9/1993 | LaFleur | E21B 33/16 166/155 |
| 5,353,691 | A | * | 10/1994 | Haber | A61M 5/31513 92/159 |

(Continued)

*Primary Examiner* — Joseph M Rocca
*Assistant Examiner* — Daniel S Yeagley

(57) ABSTRACT

A protective sealing plug system for towing hitch receivers is provided having a main body for fittingly engaging within the cavity of a towing hitch receiver. The body is formed of a resilient or flexible material that retain oils or other corrosion inhibiting substances and hold them in place against the inside of the female receiver tube. A mechanism for urging the flexible material to compress slightly and, in the process, expand slightly allows the main body to be engaged within the hitch receiver in a manner that both prevents access by outside elements, but also prevents egress of the main body from the hitch receiver until desired by the user. When installed in the female hitch receiver, the expansion of the resilient body will seal the female receiver tube and prevent the ingress of water, dirt or other damaging elements. Retraction of the resilient body will cause the flexible body to retract, allowing removal from the receiver hitch.

14 Claims, 8 Drawing Sheets

(56) References Cited

U.S. PATENT DOCUMENTS

| | | | | |
|---|---|---|---|---|
| 5,460,111 | A * | 10/1995 | Frahn | B63B 13/00 114/197 |
| 5,593,170 | A * | 1/1997 | Chiu | B60D 1/60 280/422 |
| 5,901,752 | A * | 5/1999 | Lundman | F16L 55/134 138/89 |
| 5,915,900 | A * | 6/1999 | Boltz | B60P 7/0807 410/106 |
| 6,032,695 | A * | 3/2000 | Wellen | B63B 17/04 138/89 |
| 6,086,438 | A * | 7/2000 | Wang | B60D 1/60 440/49 |
| 6,419,104 | B1 * | 7/2002 | Sarajian | B05B 15/0462 215/358 |
| 6,453,603 | B1 * | 9/2002 | Baker | A01M 1/2011 43/124 |
| 6,464,437 | B1 * | 10/2002 | Elwell | B60P 7/0807 410/106 |
| 6,494,463 | B1 * | 12/2002 | Rank | E04G 23/0203 138/89 |
| 6,662,490 | B1 * | 12/2003 | Aesch, Jr. | A01M 1/24 43/124 |
| 6,883,546 | B1 * | 4/2005 | Kobylinski | F16L 55/132 138/89 |
| 6,966,343 | B1 * | 11/2005 | Field | F16L 55/1283 138/89 |
| 6,994,326 | B1 * | 2/2006 | Tyson | E04H 17/143 138/89 |
| 7,125,035 | B1 * | 10/2006 | Huenefeld | B60D 1/58 280/507 |
| 7,942,105 | B1 * | 5/2011 | Dolton | B63B 13/02 114/197 |
| 8,037,904 | B2 * | 10/2011 | Carnevali | F16L 55/132 138/89 |
| 8,146,297 | B2 * | 4/2012 | Testu | E04H 3/16 4/503 |
| 8,596,941 | B2 * | 12/2013 | Marlow | B60Q 1/2634 292/257 |
| 8,672,371 | B1 * | 3/2014 | Russell | B60R 19/48 293/102 |
| 8,814,254 | B1 * | 8/2014 | Peffley | B62D 25/209 296/183.1 |
| 2004/0074549 | A1 * | 4/2004 | Allen | F16L 55/132 138/89 |
| 2009/0269651 | A1 * | 10/2009 | Yoshihiro | H01M 8/04201 429/515 |

\* cited by examiner

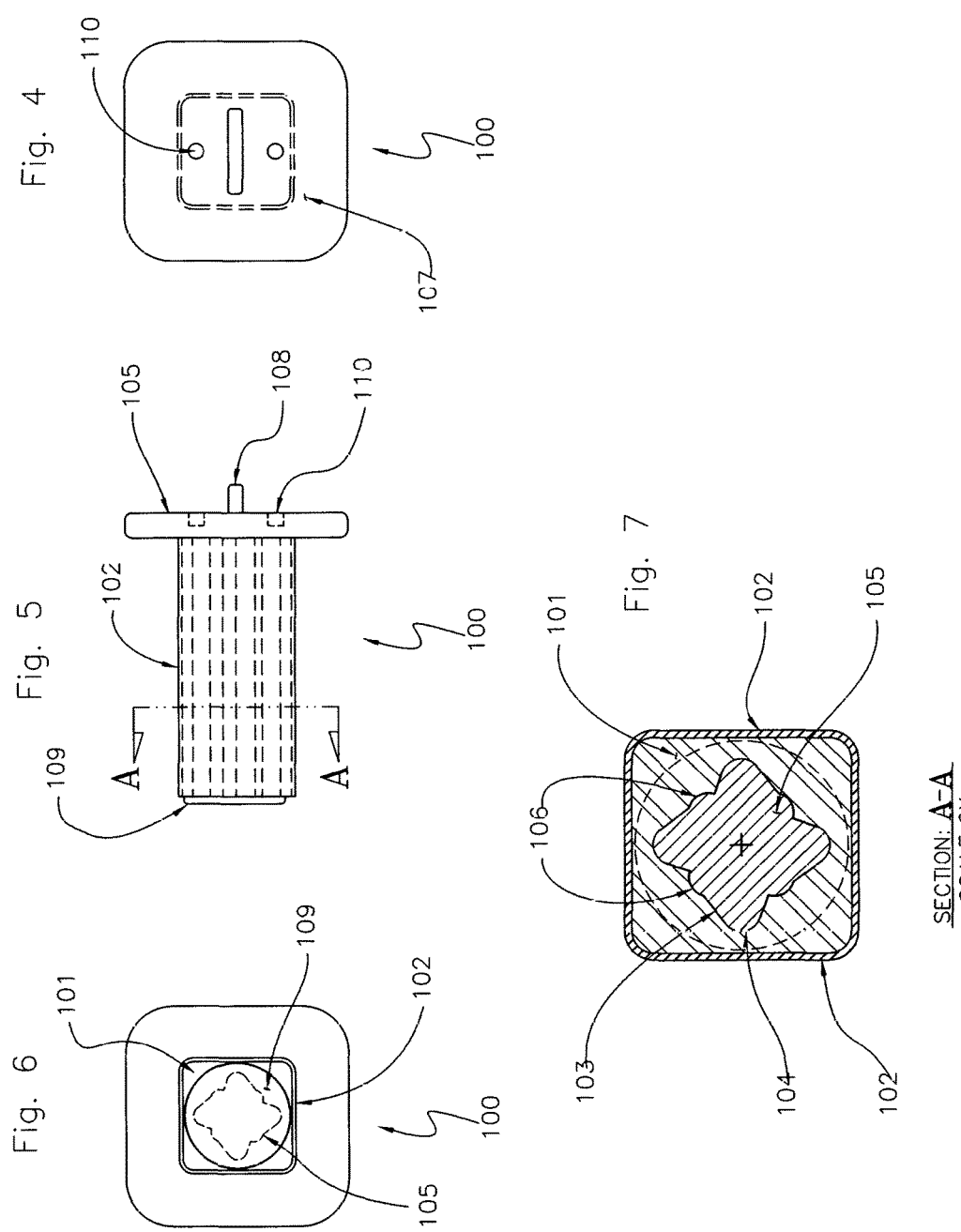

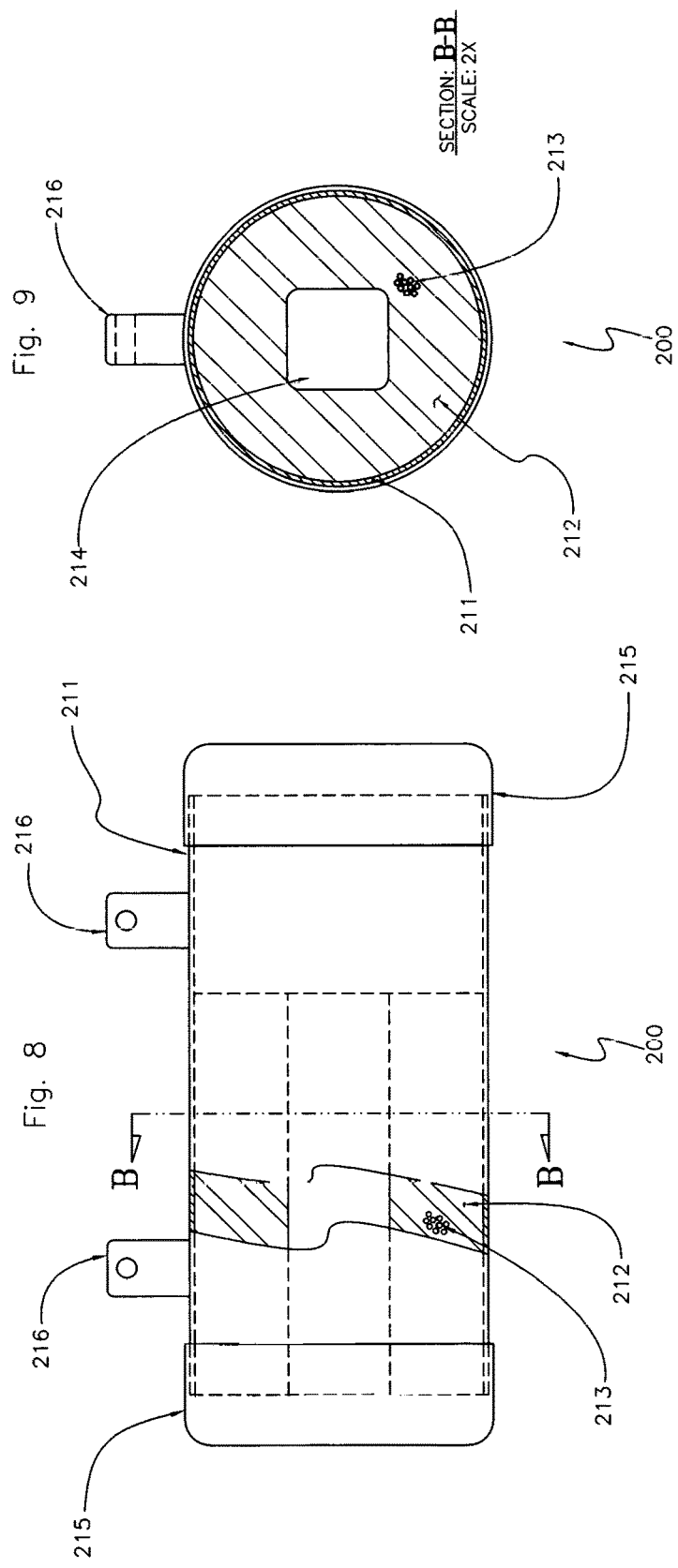

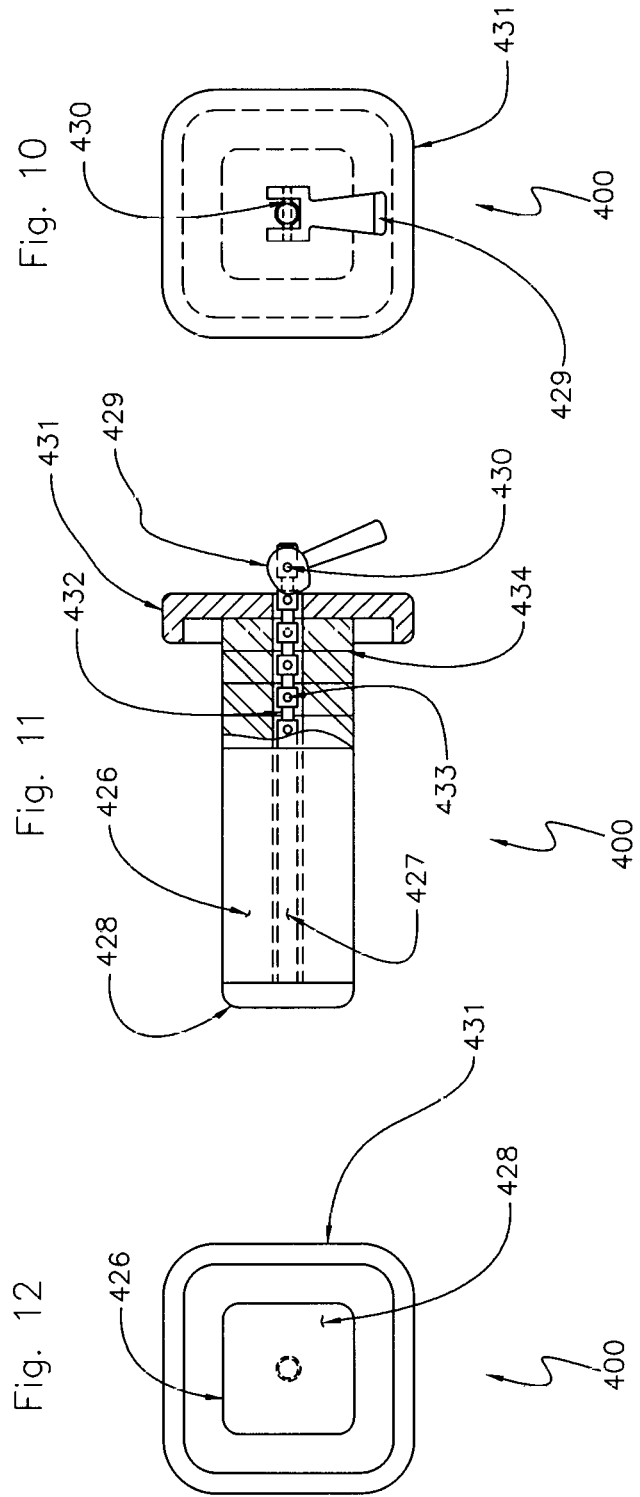

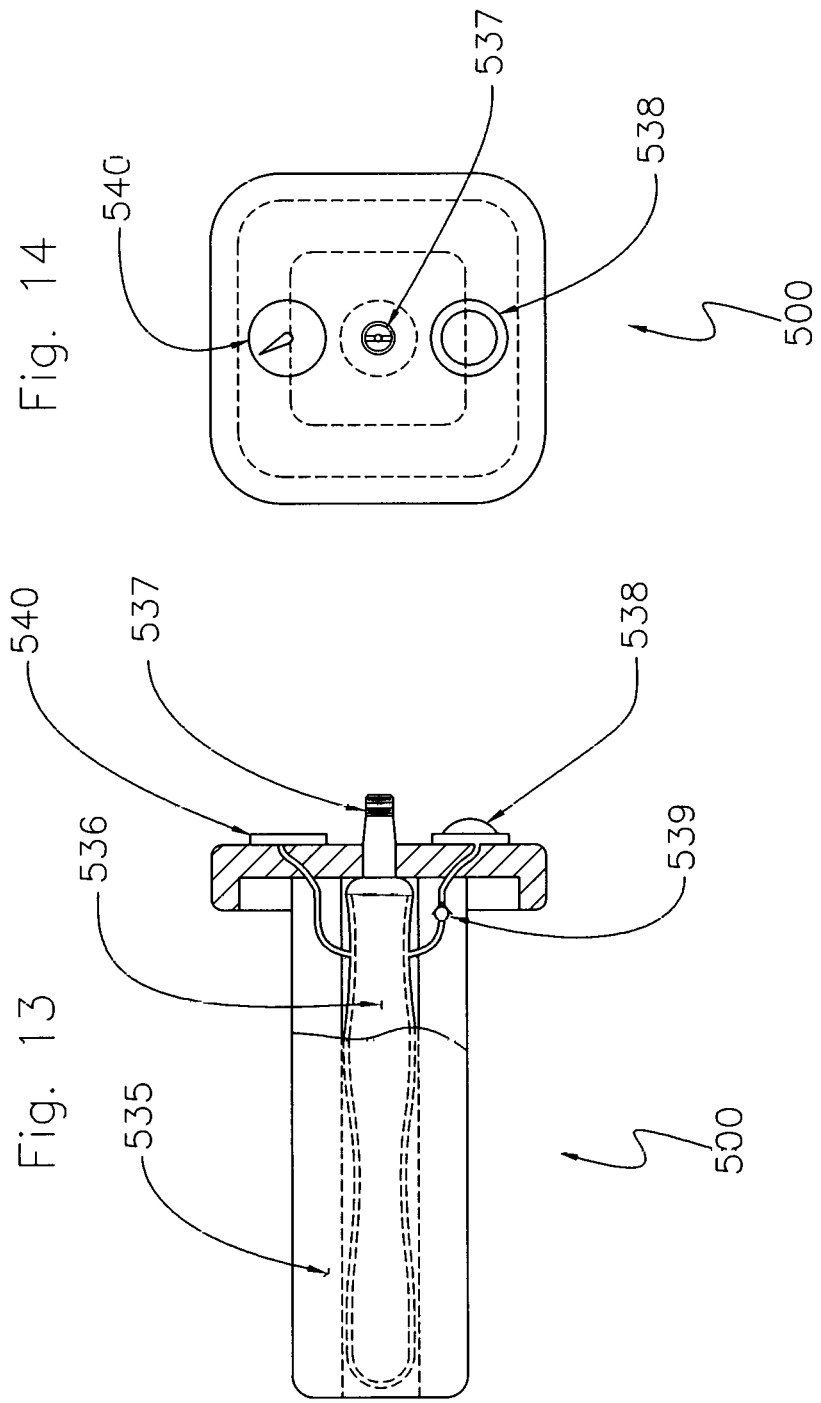

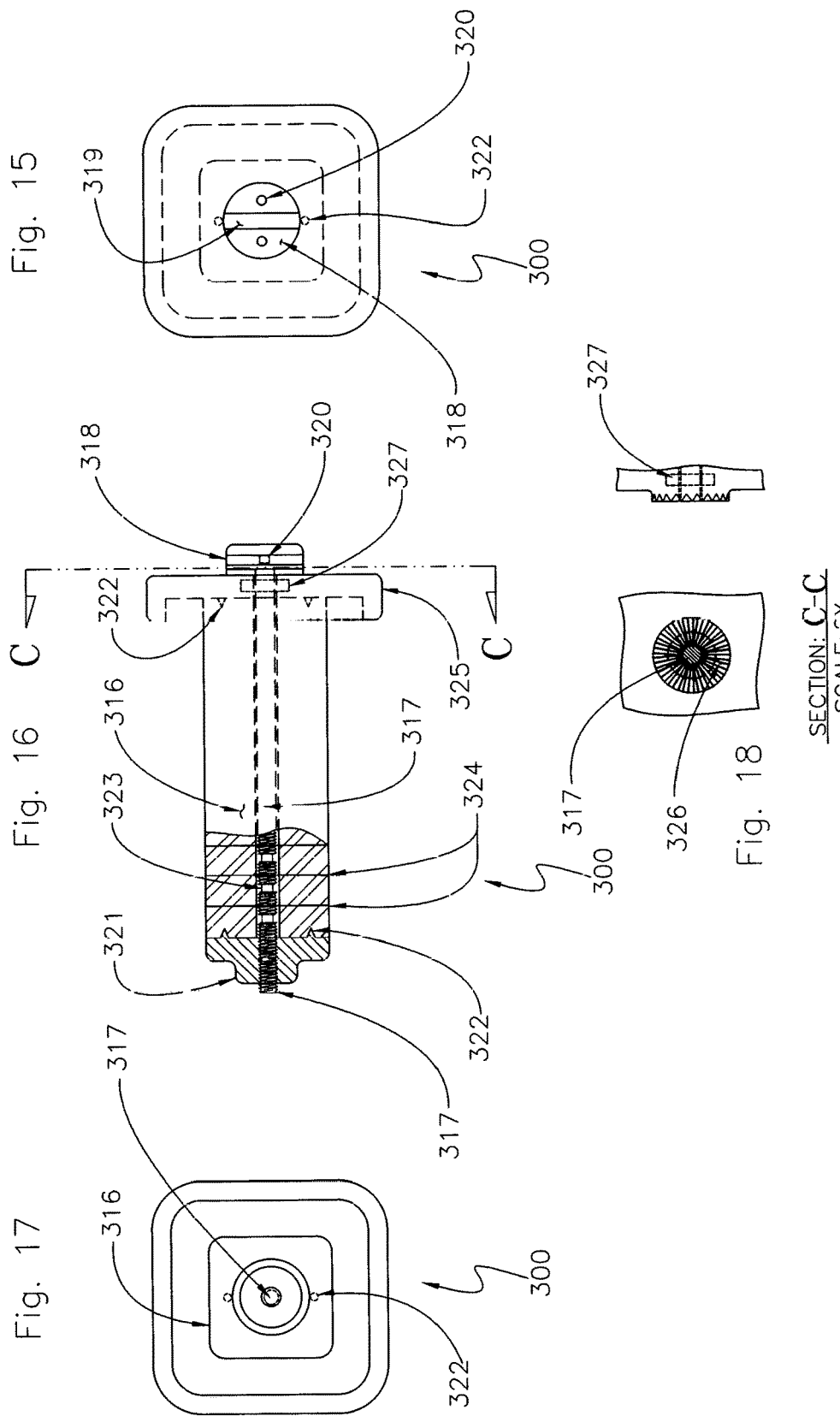

PROTECTIVE SEALING PLUG SYSTEM FOR TOWING HITCH RECEIVERS WITH SELF LUBRICATING STORAGE CONTAINER

RELATED APPLICATIONS

There are no previously filed applications anywhere in the world.

BACKGROUND OF THE INVENTION

1. Field of the Invention

The present invention relates to a vehicle trailer hitches and, more particularly, to a sealing plug system to protect and seal the female components of a trailer hitch receiver from corrosion, moisture and dirt.

2. Description of the Related Art

Trailer hitch receivers are metal assemblies that are located under a vehicle. The purpose of a trailer hitch receiver is to allow the towing vehicle to be coupled to the item being towed and effectively transfer the towing forces to the frame of the towing vehicle. These are generally fabricated from metal tubes and plates and located at the rear of the vehicle under the chassis. They typically are made of carbon steel and are painted or powder coated to prevent corrosion. Referring to FIG. 1 and FIG. 2, a typical welded steel hitch receiver assembly and its related components are shown according to the PRIOR ART.

The primary feature of the trailer hitch receiver is a female tube that is designed to mate with a male ball mount bar. This male bar slides into the female tube of the hitch receiver and is secured with a hitch pin. The hitch pin slides through aligned holes in the male bar and female receiver, locking the components together.

Typically, the hitch pin is then retained with a metal clip that slides through a hole cross drilled in the hitch pin. The male ball mount bar will have a mating feature such as a trailer towing ball or other device that will allow the bar to couple to the trailer. This hitch system construction allows for easy interchangeability of the male bar and facilitates easy removal of the male bar for storage. Typically the male ball mountbar is removed from the hitch receiver when not in use, as its protrusion from the edge of the vehicle creates a dangerous tripping and impact hazard for people walking near the vehicle. By the nature of its design, the trailer hitch system requires that the mating action between the female hitch receiver tube and the male ball mount bar be undisturbed.

Through its normal exposure to the elements, the hitch receiver assemblies corrode. This can be exaggerated in mid west area in the United States known as "The Rust Belt" where rock salt and other corrosive chemicals are spread on the roads during the winter season to melt snow. Furthermore, the rattling and sliding of the male bar within the female receiver during normal operation scratches the paint from the inside of the female receiver tube, thereby exposing the the metal to the elements which allows for the rusting and corroding of the metals. Consequently, the build up of corrosion within the female receiver tube inhibits and interferes with the normal installation of the male ball mount bar. It is not uncommon for it to be impossible to insert the male ball mount bar into the female receiver tube after its extended exposure to the elements.

The functionality of the female hitch receiver tube can also be inhibited by dirt. Off road driving enthusiasts often find their receiver tubes plugged with dirt and mud after driving their vehicle. These sporting enthusiasts enjoy crossing rivers and climbing sand dunes and often scrape the bottom of the vehicle in the mud. This can plug the female receiver tube as mud is easily forced into the open end of the tube. This makes installation of the male ball mount bar impossible. Snow can also impact itself into an unsealed receiver tube impeding the installation of the male bar.

There are countless numbers of manufacturers today that produce and market a trailer receiver plug or cap. Generally, these are made of injection molded plastic and are designed to snap into the mating open end of the female hitch receiver tube. They may have a foam gasket that helps to seal the one end of the receiver tube. There is also usually a large flat molded surface that allow for display of advertising or decorative logo. Some of the current art caps may even have lights that function as a stop light when wired into vehicle electrical harness. These caps are typically inexpensive promotional give-a-ways that do little to protect the receiver from the elements. These designs do not effectively seal the receiver tube. They do nothing to seal the open far end of the receiver tube or the holes located in the female receiver tube that accepts the hitch pin. Water, salt, deicing chemicals and dirt are all free to enter into the receiver tube and corrode the mating surfaces. A typical example of the PRIOR ART is shown at FIG. 3, as manufactured by the REESE™ manufacturing company.

Consequently, a need exists for providing a structure that actually seals and protects a hitch receiver cavity from obstructrion and/or corrosion.

SUMMARY OF THE INVENTION

It is a general object of the present invention to provide a sealing plug system to protect and seal the female components of a trailer hitch receiver from corrosion, moisture and dirt.

It is a feature of the present invention to provide a resilient body that fittingly engages within the receiver of a trailer hitch in a manner that prevents intrusion of exterior elements.

An additional feature of the present invention provides a lubricant or oil inhibiting substances within the resilient body such as to facilitate future engagement of a trailer hitch within the hitch receivers cavity.

The present invention provides a protective sealing plug system for towing hitch receivers having a main body for fittingly engaging within the cavity of a towing hitch receiver. The body is formed of a resilient or flexible material such as either self-skinning molded urethane foam or an extruded foam or a hot wire cut foam or other flexible material. The body material retain oils or other corrosion inhibiting substances and hold them in place against the inside of the female receiver tube. A mechanism for urging the flexible material to compress slightly and, in the process, expand slightly allows the main body to be engaged within the hitch receiver in a manner that both prevents access by outside elements, but also prevents egress of the main body from the hitch receiver until desired by the user.

When installed in the female hitch receiver, the expansion of the resilient body will seal the female receiver tube and prevent the ingress of water, dirt or other damaging elements. Retraction of the resilient body will cause the flexible body to retract, allowing removal from the receiver hitch.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is a front elevational view of a protective sealing plug system for towing hitch receivers according to the preferred embodiment of the present invention;

FIG. 5 is a side elevational view thereof;

FIG. 6 is a rear elevational view thereof;

FIG. 7 is a cross sectional view taken along line A-A of FIG. 5;

FIG. 8 is a side elevational view of a preferred embodiment of the self-lubricating storage container for protective sealing plug system of FIG. 4-7;

FIG. 9 is a cross sectional view taken along line B-B of FIG. 8;

FIG. 10 is a partial front elevational view of a protective sealing plug system for towing hitch receivers according to a first alternate embodiment of the present invention;

FIG. 11 is a side elevational view thereof;

FIG. 12 is a rear elevational view thereof;

FIG. 13 is a side cross sectional elevational view of a protective sealing plug system for towing hitch receivers according to a second alternate embodiment of the present invention;

FIG. 14 is a front elevational view thereof;

FIG. 15 is a front elevational view of a protective sealing plug system for towing hitch receivers according to a third preferred embodiment of the present invention;

FIG. 16 is a side elevational view thereof;

FIG. 17 is a rear elevational view thereof; and

FIG. 18 is a cross sectional view taken along line C-C of FIG. 16.

DESCRIPTION OF THE PREFERRED EMBODIMENTS

Figure 1:
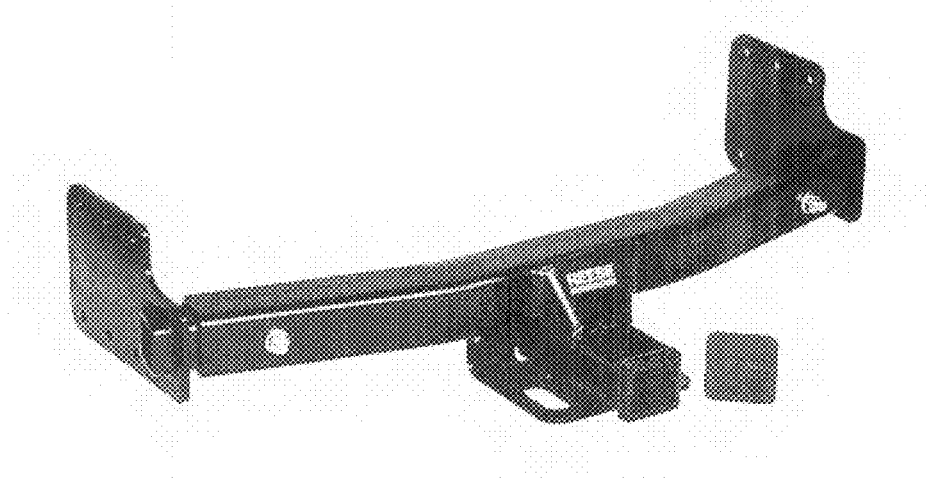
FIG. 1 depicts a rear perspective view of a receiver hitch assembly according to the PRIOR ART.
Figure 2:
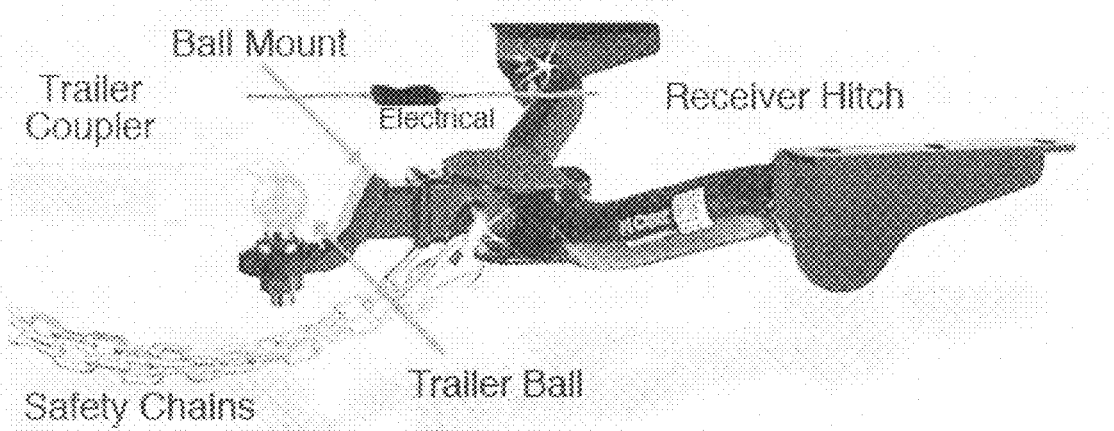
FIG. 2 depicts a side perspective view of a receiver hitch assembly according to the PRIOR ART.
Figure 3:
FIG. 3 is a front perspective view of a trailer receiver plug or cap according to the PRIOR ART.

The best mode for carrying out the invention is presented in terms of its preferred embodiment, herein depicted within the Figures.

1. Detailed Description of the Figures

Referring now to FIG. 4 through 6, a protective sealing plug system for towing hitch receivers, generally noted as 100, is shown according to the preferred embodiment of the present invention. The system 100 is formed of a main body 101 for fittingly engaging within the cavity of a towing hitch receiver. The body 101 may be manufactured from a flexible material such as self-skinning molded urethane foam. Body 101 may also be produced from an extruded foam or a hot wire cut foam or other flexible material. The nature of the body 101 material may be so that it can retain oil or other corrosion inhibiting substances and hold them in place against the inside of the female receiver tube. A separate material 102 may further be integrated into the surface of the body 101 to retain corrosion inhibiting materials against the inside of the female receiver tube. The body 101 has interior cam surfaces 103 that interact with the cam surfaces 104 on an actuator rod 105 when the actuator rod 105 is rotated within the flexible body 101. The actuator rod 105 may be molded or machined from one piece with an integral retaining ring 109. During assembly, the actuator rod 105 is pushed through the flexible body 101 until the retaining ring feature, which is slightly larger than the interior of the body exits the far end of the body, locking the actuator rod 105 into the body 101. This retaining feature may be located at an alternate position within the assembly. Logo surfaces 107 and finger grabs 108 or rotation tool features 110 can be integrated into the actuator rod 105. A special rotation tool (not shown) such as a spanner wrench may be used to engage with the rotation tool features 110. Requiring a special tool to rotate the actuator rod may be used to prevent tampering and theft of the plug assembly.

Rotation of the actuator rod 105 causes its cam surfaces 104 to interact with the cam surfaces 103 of the body 101 and expand the molded body 101 outwards. Surface 106 acts as detent to lock the cam surfaces 104 of the actuator rod 105 in place to prevent the actuator rod 105 from rotating backwards or over rotating.

When installed in the female hitch receiver and the actuator rod 105 is rotated, the expansion of the resilient body will seal the female receiver tube and prevent the ingress of water, dirt or other damaging elements. Rotating the actuator rod in the opposite direction will cause the flexible body to retract, allowing removal from the receiver hitch.

Referring now to FIG. 8 and FIG. 9, a self-lubricating storage container, generally noted as 200, is provided for the hitch plug assemblies 100 described herein. The container body 211 has an inner liner 212 constructed of a porous foam or similar material that is impregnated with a suitable lubricant or rust inhibitor 213. When the protective hitch plug 100 is removed from the hitch receiver, it is inserted into the cavity 214 where it comes into contact with the lubricant that is subsequently transferred to the surface of the protective hitch plug. The protective container is then closed and allows for clean and easy storage until it is needed.

A preferred design for the container would have the container body 211 constructed from a clear extruded plastic. The two end caps 215 may be used to enclose each end, and may be dip-molded and designed to fittingly engage on the ends of the container body 211. The container body 211 may be constructed from Poly Vinyl Chloride or a similar material. A pair of mounting brackets 216 may be affixed, incorporated or extended from the housing in order to provide convenient attachment for the container to a hitch or elsewhere.

Referring now to FIG. 10 through FIG. 12, a second alternative design for the sealing plug, generally noted as 400, is provided where the body 426 is constructed of a flexible material as previously described in the preferred embodiment of the invention. A rod 427, with an integral stop plate 428 extends through the flexible body 426. An over center acting toggle cam 429 when rotated about pivot pin 430 draws the rod 427 towards the back up plate 431 causing the flexible body 426 expand and seal against the interior of the female hitch receiver tube. The rod 427 and flexible body 426 may contain necked down features 432 and multiple pivot pin holes 433 or perforations 434 that allow the rod 427 and flexible body 426 to be torn down or broken off to the length required for the specific trailer hitch receiver tube length.

Referring now to FIG. 13 and FIG. 14, a third alternate embodiment for the sealing plug, generally noted as 500, is shown where the body 535 constructed of a flexible material as previously described in the preferred embodiment of the invention. An air bladder 536 is inflated to expand the flexible body 535, causing it to seal against the interior of the female hitch receiver tube. The air bladder 536 may be inflated by an external air compressor through a Schrader or other type valve 537. The air bladder may also be inflated by an integral bulb air pump 538 and releasable check valve system 539 built into the receiver plug. Additionally, an air pressure gauge 540 may be incorporated as viewable from the body 535 and in fluid communication with the bladder 536 to allow a user to visually identify proper functionality and securement of the sealing plug 535.

Referring now to FIG. 15 through FIG. 17, a fourth alternative design for the sealing plug, generally noted as 300, is shown where the body 316 is similarly constructed of a flexible material as previously described in the preferred embodiment of the invention. A threaded rod 317, with an integral knob 318 that contains finger grabs 319 or rotation tool features 320 extending through the flexible body and threads into the end nut plate 321. The nut plate 321 may have spikes 322 or other features that penetrate into the flexible body 316 to prevent spinning when the threaded rod 317 is rotated. The threaded rod 317 and flexible body 316 may contain necked down features 323 or perforations 324 that allow the threaded rod 317 and flexible body 316 to be torn down or broken off to the length required for the specific trailer hitch receiver tube length. A thrust plate 325 which also contains anti-rotation features 322 is located between the body 316 and the knob 318. Ratcheting teeth or a ratcheting mechanism 326 located on the thrust plate 325 and the bottom of the knob 318 prevents the threaded rod from unscrewing. When the knob 318 is rotated, it turns the threaded rod 317 that in turn draws in the end nut plate 321 causing the flexible body 316 to expand and seal against the interior of the female hitch receiver tube. A torque limiting clutch 327 prevents overtightening of the threaded rod 317.

2. Operation of the Preferred Embodiment

The primary feature of a trailer hitch receiver is that a female tube is designed to mate with a male ball mount bar. This male bar slides into the female tube of the hitch receiver and is secured with a hitch pin. The hitch pin slides through aligned holes in the male bar and female receiver, locking the components together. In any embodiment of the present invention, the towing hitch receiver is protected from obstruction and corrosion by insertion and retention of the protective sealing plug system for towing hitch receivers. The sealing body is held in place against the inside of the female receiver tube and provides a barrier to the intrusion of outside elements. A mechanism for urging the flexible material to compress slightly and, in the process, expand slightly allows the main body to be engaged within the hitch receiver in a manner that both prevents access by outside elements, but also prevents egress of the main body from the hitch receiver until desired by the user. When installed in the female hitch receiver, the expansion of the resilient body will seal the female receiver tube and prevent the ingress of water, dirt or other damaging elements. Retraction of the resilient body will cause the flexible body to retract, allowing removal from the receiver hitch. The ability to discharge lubricant into the inside surface of the hitch receiver further allows the easier installation or withdrawal of the trailer hitch into and out of the receiver tube.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. A protective sealing plug system for a towing hitch receiver having a female tube for mating with a male ball mount bar and secured by a hitch pin which slides through aligned holes formed in the male ball mount bar and the female tube, respectively locking together the male ball mount bar and the female tube, said protective sealing plug system comprising:
    a main body for fittingly engaging within a cavity of the female tube of the towing hitch receiver, said main body formed of a resilient or flexible material and said main body further having an overall length sufficient to nest within said female tube past the aligned holes formed within the female tube;
    a compression device for compressing the resilient or flexible material of the main body slightly in a radial direction along a linear centerline of the main body and, in the process, expand the material of the main body slightly radially outward to allow the main body to be engaged within the hitch receiver in a manner that both seals said female tube and prevents egress of the main body from the hitch receiver until desired by a user, wherein said compression device for compressing the main body to compress slightly further comprises a rotatable actuator rod placed linearly through said main body and having exterior earn surfaces that interact with the flexible main body when rotated, wherein rotation of the actuator rod causes said cam surfaces to interact with inside surfaces of the main body and expand the main body outwards;
    wherein said main body is thereby retained within said cavity of the female tube without a need for additional fasteners or pins for mechanically penetrating said towing hitch receiver.

2. The system of claim 1, wherein said main body is formed of a self-skinning molded urethane foam.

3. The system of claim 1, wherein said main body is formed of an extruded foam or a hot wire cut foam material.

4. The system of claim 1, wherein said main body retains oils or other corrosion inhibiting substances against an inside surface of the female tube of the towing hitch receiver.

5. A protective sealing plug system for a towing hitch receiver having a female tube for mating with a male ball mount bar and secured by a hitch pin which slides through aligned holes formed in the male ball mount bar and the female tube, respectively locking together the male ball mount bar and the female tube, said protective sealing plug system comprising:

a main body for fittingly engaging within a cavity of the female tube of the towing hitch receiver, said main body formed of a resilient or flexible material and said main body further having an overall length sufficient to nest within said female tube past the aligned holes formed within the female tube;

a compression device for compressing the resilient or flexible material of the main body slightly in a radial direction along a linear centerline of the main body and, in the process, expand the material of the main body slightly radially outward to allow the main body to be engaged within the hitch receiver in a manner that both seals said female tube and prevents egress of the main body from the hitch receiver until desired by a user, wherein said compression device for compressing the main body to compress slightly further comprises a rotatable actuator rod placed linearly through said main body and having exterior cam surfaces that interact with the flexible main body when rotated, wherein rotation of the actuator rod causes said cam surfaces to interact with inside surfaces of the main body and expand the main body outwards; and wherein said main body is thereby retained within said cavity of the female tube without a need for additional fasteners or pins for mechanically penetrating said towing hitch receiver; and a self-lubricating storage container.

6. The system of claim 5, wherein said self-lubricating storage container comprises:

a container body having an inner liner of a material that is impregnated with a lubricant or rust inhibitor; and two end caps used to enclose each end of said container body.

7. The system of claim 6, wherein said container body is constructed from a clear extruded plastic.

8. The system of claim 5, wherein said main body is formed of a self-skinning molded urethane foam.

9. The system of claim 5, wherein said main body is formed of an extruded foam or a hot wire cut foam material.

10. The system of claim 5, wherein said main body retains oils or other corrosion inhibiting substances against an inside surface of the female tube of the towing hitch receiver.

11. A protective sealing system for a towing hitch receiver having a female tube for mating, with a male ball mount bar and secured by a hitch pin which slides through aligned holes formed in the male ball mount bar and the female tube, respectively locking together the male ball mount bar and the female tube, said protective sealing plug system comprising:

a main body for fittingly engaging within a cavity of the female tube of the towing hitch receiver, said main body formed of a resilient or flexible material and said main body further having an overall length sufficient to nest within said female tube past the aligned holes formed within the female tube;

a compression device for compressing the length of the resilient or flexible material of the main body slightly along a linear centerline of the main body and, in the process, expands the material of the main body slightly radially outward to allow the main body to be engaged within the hitch receiver in a manner that both seals said female tube and prevents egress of the main body from the hitch receiver until desired by a user, wherein said main body is thereby retained within said cavity of the female tube without a need for additional fasteners or pins for mechanically penetrating said towing hitch receiver, wherein the compression device for urging the main body to compress slightly further comprises:

a rod with an integral stop plate that extends through the flexible main body; and an over center acting toggle cam that when rotated about a pivot pin draws the rod towards a back up plate, thereby causing the flexible main body to expand and seal against an interior surface of the female tube of the towing hitch receiver;

wherein said rod forms a necked down feature and said main body forms multiple pivot pin holes or perforations that allow the rod and the flexible main body to be torn down or broken off to a length required for specific trailer hitch receiver tube length.

12. The system of claim 11, wherein said main body is formed of a self-skinning molded urethane foam.

13. The system of claim 11, wherein said main body is formed of an extruded foam or a hot wire cut foam material.

14. The system of claim 11, wherein said main body retains oils or other corrosion inhibiting substances against an inside surface of the female tube of the towing hitch receiver.

* * * * *